Figure 1:
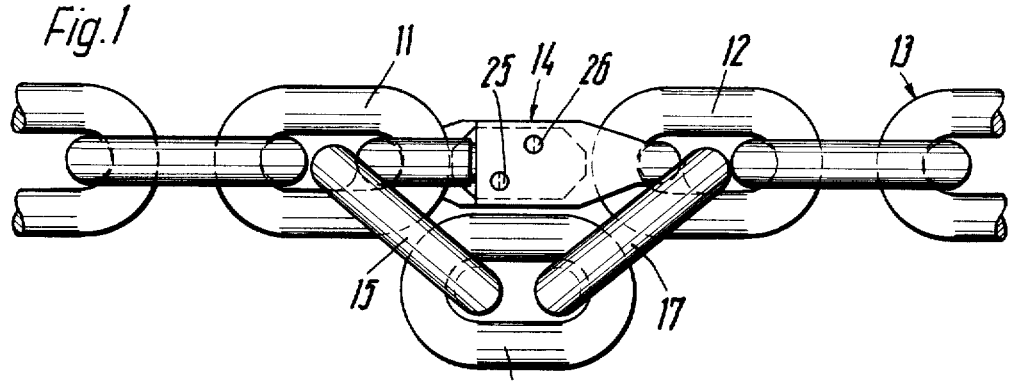

United States Patent [19]
Dalferth

[11] 3,885,428
[45] May 27, 1975

[54] OVERLOAD TESTING OF CHAINS

[76] Inventor: Hans Horst Dalferth, Haydnstrasse 21, 7083 Wasseralfingen, Germany

[22] Filed: Dec. 6, 1973

[21] Appl. No.: 422,414

[30] Foreign Application Priority Data
Dec. 12, 1972 Germany.............................. 2261164

[52] U.S. Cl............................. 73/143; 116/DIG. 34
[51] Int. Cl. ............................................. G01l 5/04
[58] Field of Search...................... 73/95, 143, 158; 116/DIG. 34; 294/74; 59/78, 93

[56] References Cited
UNITED STATES PATENTS
3,077,178   2/1963   Gordon ........................ 73/143 UX
FOREIGN PATENTS OR APPLICATIONS
139,131   5/1960   U.S.S.R................................ 73/143

Primary Examiner—Jerry W. Myracle
Attorney, Agent, or Firm—Smythe & Moore

[57] ABSTRACT

The invention relates to a device for and a method of testing whether the safe working load of the links of a chain, whether it be a lashing and/or a belaying chain, is being exceeded. The invention provides that an overload testing device is detachably connected in parallel with a portion of the chain length to two links of the chain to be tested so that the normal distance between said two links is reduced by the testing device and so that the links intervening between said two links are completely relieved of load. Advantageously the testing device includes at least one intermediate member which is visibly deformed when the safe working load of the links of the chain to be tested is exceeded. The invention also embraces a chain in combination with such an overload testing device. Advantageously, the intermediate member consists of two U-shaped elements which are detachably connected by locking means and that an abutment member is so interposed with clearance between the limbs of the interconnected U-shaped elements that the limbs pull into contact with said abutment member when the safe working load of the chain links is exceeded.

4 Claims, 4 Drawing Figures

OVERLOAD TESTING OF CHAINS

The invention relates to overload testing of round link chains particularly chains used for lashing down and belaying, utilizing a test element which indicates an overload when the safe working load of the links of the chain is exceeded.

A known arrangement of the specified kind is one in which the test element is a circular ring-shaped link which elongates into an oval when the safe working load of the chain links is exceeded. In order to provide a clearly visible indication the circular ring-shaped member must have a relatively large diameter. This causes the device to be unduly bulky in a manner that is not always desirable. It is therefore an object of the present invention to eliminate this difficulty and to provide a device of the contemplated kind in which the test element is narrower than the conventional circular ring-shaped test elements.

Broadly stated, the invention provides an overload testing device which consists of a chain coupler attachable to two links of the chain to take up the load between these two links of the chain, said chain coupler including at least one part which visibly deforms when the safe working load of the links of the chain has been reached.

The use of a chain coupler as a testing device not only satisfies the requirement of compactness, but also offers the additional advantage of permitting such a test element to be easily replaced.

A particularly useful arrangement is one in which the chain coupler comprises two U-shaped interconnectable coupling elements and an abutment member so interposed with clearance between the limbs of the U-shaped elements, that the limbs pull into contact with said abutment member when the safe working load is exceeded.

This latter arrangement has the advantage that the deformation of the U-shaped elements of the coupler is better controllable than that of a circular ring-shaped member.

Figure 2:
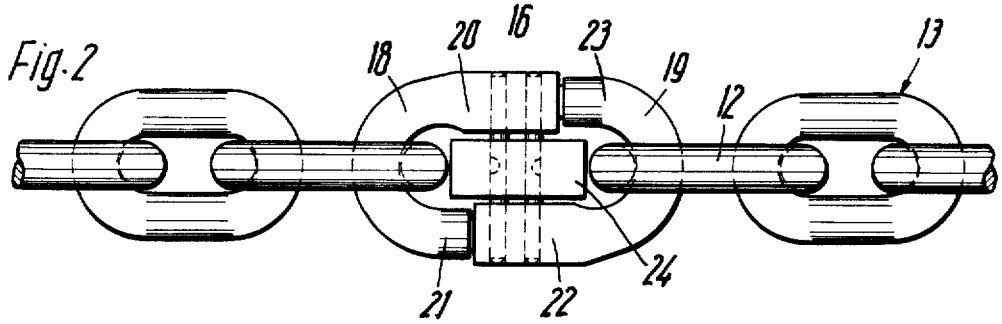
Figure 3:
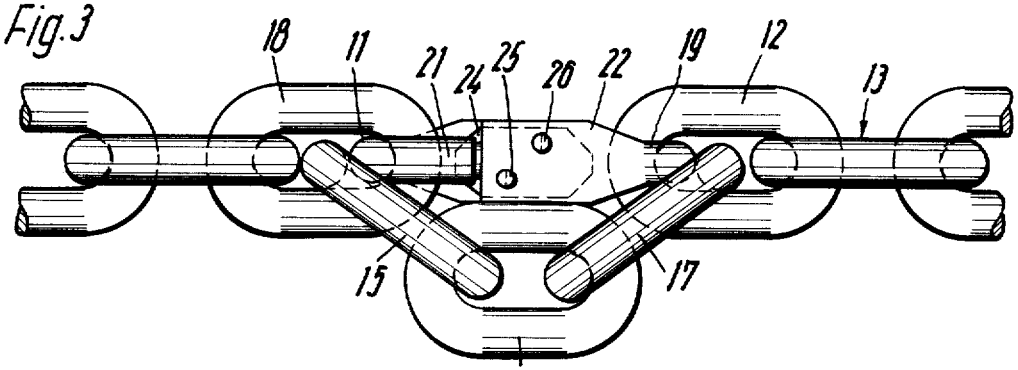
Figure 4:
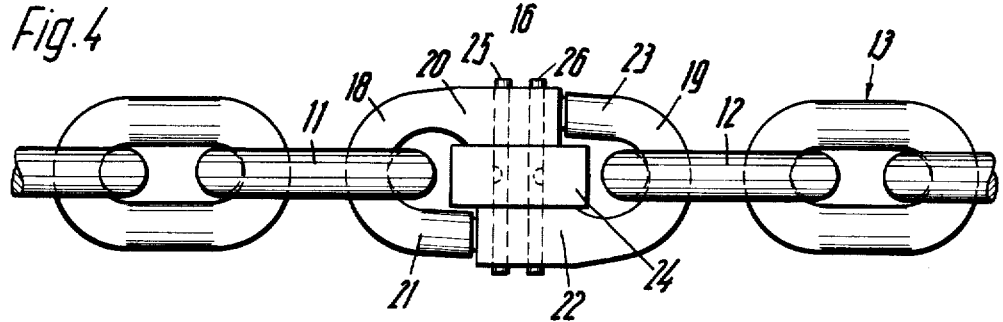

The invention will be hereinafter more particularly described with reference to an embodiment shown in the drawing in which:

FIG. 1 is a side view of a portion of a belaying chain to which a test coupler has been attached, shown prior to deformation, FIG. 2 is a view from above of the same portion of chain and of the coupler in FIG. 1, FIG. 3 is a side view corresponding to FIG. 1 of the test coupler after deformation, and FIG. 4 is a view from above similar to that in FIG. 2 of the same portion of chain after deformation as in FIG. 3.

Referring to the drawing, 11 and 12 are two links of a chain 13 connected together by a chain coupler 14 which thus forms a load relieving bridge in parallel with the links 15, 16 and 17 of the chain. The chain coupler 14 consists of two U-shaped elements 18 and 19. The limbs of these elements 18 and 19 respectively, are indicated at 20, 21 and 22, 23. Located between these limbs of the elements of the coupler is an abutment member 24 so arranged that clearance remains between the abutment member and the undeformed limbs of the elements of the coupler, as will be understood by reference to FIG. 2. The two elements 18 and 19 of the coupler are coupled together by locking means in the form of pins 25 and 26. These pass through transverse holes in the ends of the limbs 20 and 22 and engage grooves in the ends of the limbs 21 and 23 which are received into sockets formed in the ends of the limbs 20 and 22.

When the chain 13 is overloaded the two members of the coupler 18 and 19 are deformed in as much as the limbs 20 and 23 as well as the limbs 21 and 22 are pulled inwards into closer proximity. Consequently the clearance gaps between the limbs and the abutment member close and the parts assume the positions shown in FIGS. 3 and 4 of the drawing.

It will be apparent from a comparison of FIGS. 2 and 4 that the user of the chain can readily recognise the deformation of the test coupler firstly because of the disappearance of the clearance gaps between the abutment member 24 and the limbs of the coupler elements 18 and 19 and secondly because the ends of the locking means in the form of pins 25 and 26 will now project from the outsides of the limbs of the coupler elements.

Instead of consisting of two separate pins 25 and 26 the locking means may comprise a single U-shaped pin.

I claim:

1. An overload indicating device for round link chains for lashing and belaying comprising an indicating chain coupler, said coupler including two spaced elements attachable to two links of said chain, said elements being connected together, and means interposed between said spaced elements and engageable therewith when the safe working load of said chain links is exceeded.

2. A device according to claim 1, characterised in that the chain coupler consists of two U-shaped elements detachably connected by locking means, said means between said elements comprising an abutment member so interposed with clearance between the limbs of the interconnected U-shaped elements that the latter pull into contact with said abutment member when the safe working load of the chain links is exceeded.

3. A device according to claim 2, characterised in that one limb of a first element of the coupler has a socket at its end for the reception of the end of one limb of the other element of the coupler, the second limb of the first element of the coupler fitting into a corresponding socket in the end of the second limb of the other element of the coupler, said sockets being intersected by at least two transverse bores for the reception of the locking means which are in the form of pins and the ends of the limbs fitting into the cooperating sockets on opposite sides being formed with relatively staggered transverse grooves for the reception of part of the peripheries of the locking elements.

4. A chain in combination with an overload testing device as defined in claim 2, wherein the overload testing device is connected to two links of a portion of the chain length, there being further links intervening between said two links which are relieved of load by the testing device which is connected in parallel with said intervening links.

* * * * *